United States Patent
Branda et al.

(10) Patent No.: US 7,904,691 B2
(45) Date of Patent: *Mar. 8, 2011

(54) AUTONOMICALLY ADJUSTING ONE OR MORE COMPUTER PROGRAM CONFIGURATION SETTINGS WHEN RESOURCES IN A LOGICAL PARTITION CHANGE

(75) Inventors: Steven Joseph Branda, Rochester, MN (US); John Joseph Stecher, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 420 days.

This patent is subject to a terminal disclaimer.

(21) Appl. No.: 12/058,140

(22) Filed: Mar. 28, 2008

(65) Prior Publication Data

US 2008/0177976 A1 Jul. 24, 2008

Related U.S. Application Data (63) Continuation of application No. 11/330,684, filed on Jan. 12, 2006, now Pat. No. 7,461,231.

(51) Int. Cl.
*G06F 12/00* (2006.01)
(52) U.S. Cl. .................. 711/173; 711/E12.016; 718/104
(58) Field of Classification Search .................. 711/170, 711/173; 718/104
See application file for complete search history.

(56) References Cited

U.S. PATENT DOCUMENTS

| | | | |
|---|---|---|---|
| 7,461,231 B2 * | 12/2008 | Branda et al. ............... | 711/173 |
| 2003/0037092 A1 | 2/2003 | McCarthy et al. | |
| 2004/0168170 A1 | 8/2004 | Miller | |
| 2004/0215905 A1 | 10/2004 | Armstrong et al. | |
| 2005/0071446 A1 | 3/2005 | Graham et al. | |
| 2005/0091366 A1 | 4/2005 | Acharya | |
| 2005/0262516 A1 | 11/2005 | Chow et al. | |
| 2005/0268052 A1 | 12/2005 | Hepkin et al. | |
| 2005/0281095 A1 | 12/2005 | Eilert et al. | |
| 2006/0047794 A1 | 3/2006 | Jezierski | |
| 2006/0080665 A1 | 4/2006 | Chavoustie et al. | |
| 2006/0090162 A1 | 4/2006 | Flores et al. | |
| 2006/0123217 A1 | 6/2006 | Burdick et al. | |
| 2006/0136928 A1 | 6/2006 | Crawford et al. | |

\* cited by examiner

*Primary Examiner* — Matt Kim
*Assistant Examiner* — Hal Schnee
(74) *Attorney, Agent, or Firm* — Martin & Associates, LLC; Derek P. Martin (57) ABSTRACT

A computer program communicates with a partition manager in the logical partition where the computer program is run. When resource allocation in the logical partition dynamically changes, the partition manager notifies the computer program of the configuration change. The computer program may autonomically adjust one or more configuration settings that affect performance of the computer program to dynamically tune the computer program to optimal performance each time the allocation of resources within the logical partition changes. The partition manager may notify the computer program of an impending change in resource allocation in the logical partition that runs the computer program, which allows the computer program to reconfigure its configuration setting(s) before the partition manager changes the resource allocation in the logical partition.

22 Claims, 8 Drawing Sheets

DLPAR Reallocation of Hardware Resources in
Logical Partition C

AUTONOMICALLY ADJUSTING ONE OR MORE COMPUTER PROGRAM CONFIGURATION SETTINGS WHEN RESOURCES IN A LOGICAL PARTITION CHANGE

CROSS-REFERENCE TO PARENT APPLICATION

This patent application is a continuation of "Apparatus and Method for Autonomically Adjusting One or More Computer Program Configuration Settings When Resources in a Logical Partition Change," U.S. Ser. No. 11/330,684 filed on Jan. 12, 2006, which is incorporated herein by reference.

BACKGROUND OF THE INVENTION

1. Technical Field

This invention generally relates to data processing, and more specifically relates to performance enhancement in a logically partitioned computer system.

2. Background Art

Computer systems typically include a combination of hardware and software. The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources into different computing environments. The eServer iSeries computer system developed by IBM is an example of a computer system that supports logical partitioning. If logical partitioning on an eServer iSeries computer system is desired, partition manager code (referred to as a "hypervisor" in IBM terminology) is installed that allows defining different computing environments on the same platform. Once the partition manager is installed, logical partitions may be created that define different computing environments. The partition manager manages the logical partitions to assure that they can share needed resources in the computer system while maintaining the separate computing environments defined by the logical partitions.

A computer system that includes multiple logical partitions typically shares resources between the logical partitions. For example, a computer system with a single CPU could have two logical partitions defined, with 50% of the CPU allocated to each logical partition, with 33% of the memory allocated to the first logical partition and 67% of the memory allocated to the second logical partition, and with two different I/O slots allocated to the two logical partitions, one per partition. Once logical partitions are defined and shared resources are allocated to the logical partitions, each logical partition acts as a separate computer system. Thus, in the example above that has a single computer system with two logical partitions, the two logical partitions will appear for all practical purposes to be two separate and distinct computer systems.

More recently, dynamic allocation of resources among logical partitions has been made possible. Some IBM computer systems support dynamic logical partitioning (DLPAR), which allows resources (such as CPUs and memory) to be dynamically allocated to or from logical partitions while the logical partitions are running. This ability to dynamically allocate resources can affect performance of computer software running within the logical partitions. For example, an application server running in a logical partition may have a thread pool size and heap size that is selected to provide the best performance assuming a given allocation of resources. If the allocation of resources dynamically changes, the application server will be unaware of the change, and the thread pool size and heap size that was originally selected for the application may provide less-than-optimal performance with a new allocation of resources in the logical partition that runs the application server. The result is an application server that does not run as efficiently as it could due to changing resources in the logical partition that runs the application server. Without a way to make computer software aware of changes in resource allocation in a logical partition, thereby allowing the computer software to autonomically change one or more configuration settings that determine the performance of the computer software, the computer industry will continue to suffer from static computer software that is oblivious to changes in resource allocation in a logical partition that runs the computer software.

DISCLOSURE OF INVENTION

A computer program communicates with a partition manager in the logical partition where the computer program is run. When resource allocation in the logical partition dynamically changes, the partition manager notifies the computer program of the configuration change. The computer program may then autonomically adjust one or more configuration settings that affect performance of the computer program to dynamically tune the computer program to optimal performance each time the allocation of resources within the computer program's logical partition changes. In one embodiment, the partition manager notifies the computer program of an impending change in resource allocation in the logical partition that runs the computer program. The computer program may delay the impending change to give the computer program a chance to reconfigure its configuration setting(s) before the partition manager changes the resource allocation in the logical partition. The computer program may then signal the partition manager to proceed with the change. If the computer program does not respond within a prescribed time period, the partition manager will make the change even if the computer program does not respond.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION 1.0 Overview

The present invention relates to the performance of logically-partitioned computer systems. For those not familiar with the concepts of logical partitions, this Overview section will provide background information that will help to understand the present invention.

Known Logical Partition Systems and Tools

Figure 2:
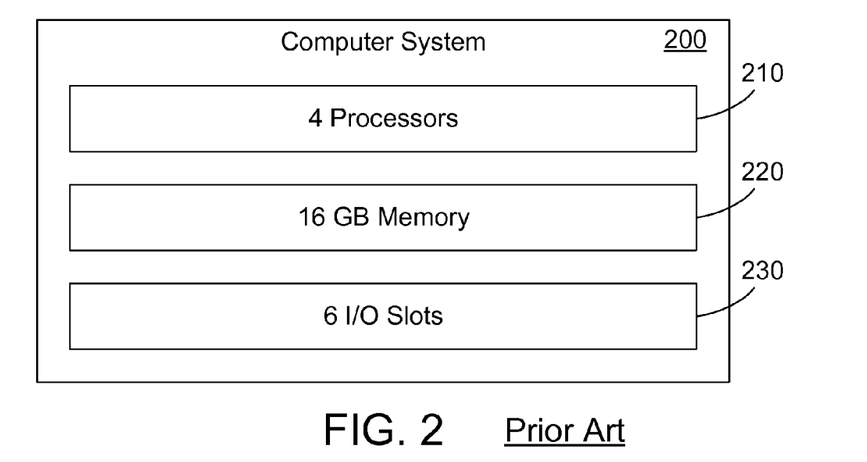
FIG. 2 is a block diagram of a prior art computer system before logical partitioning.
Figure 3:
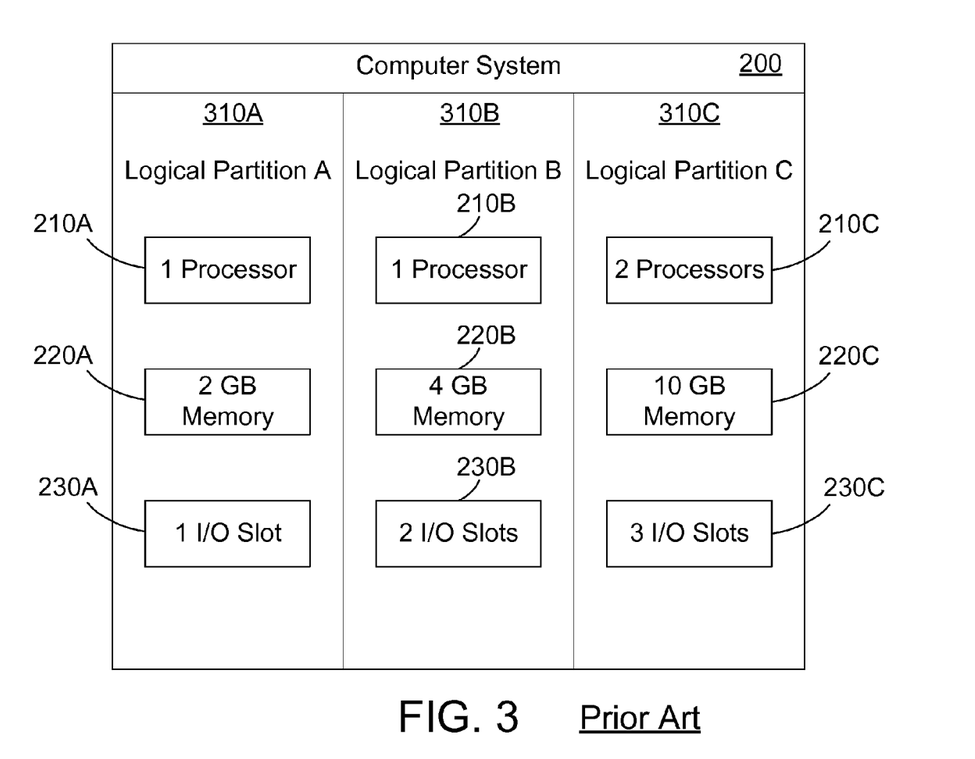
FIG. 3 is a block diagram of the prior art computer system in FIG. 2 after logical partitioning.

As stated in the Background Art section above, a computer system may be logically partitioned to create multiple virtual machines on a single computer platform. Referring to FIG. 2, a sample computer system 200 is shown to include four processors 210, 16 GB of main memory 220, and six I/O slots 230. Note that there may be many other components inside a prior art computer system that are not shown in FIG. 2 for the purpose of simplifying the discussion herein. We now assume that the computer system 200 is configured with three logical partitions, as shown in FIG. 3. The first logical partition 310A is defined to have one processor 210A, 2 GB of memory 220A, and one I/O slot 230A. The second logical partition 310B is defined to have one processor 210B, 4 GB of memory 220B, and 2 I/O slots 230B. The third logical partition 310C is defined to have two processors 210C, 10 GB of memory 220C, and three I/O slots 230C. Note that the total number of processors 210A+210B+210C equals the four processors 210 in the computer system. Likewise for the memory and I/O slots.

Figure 4:
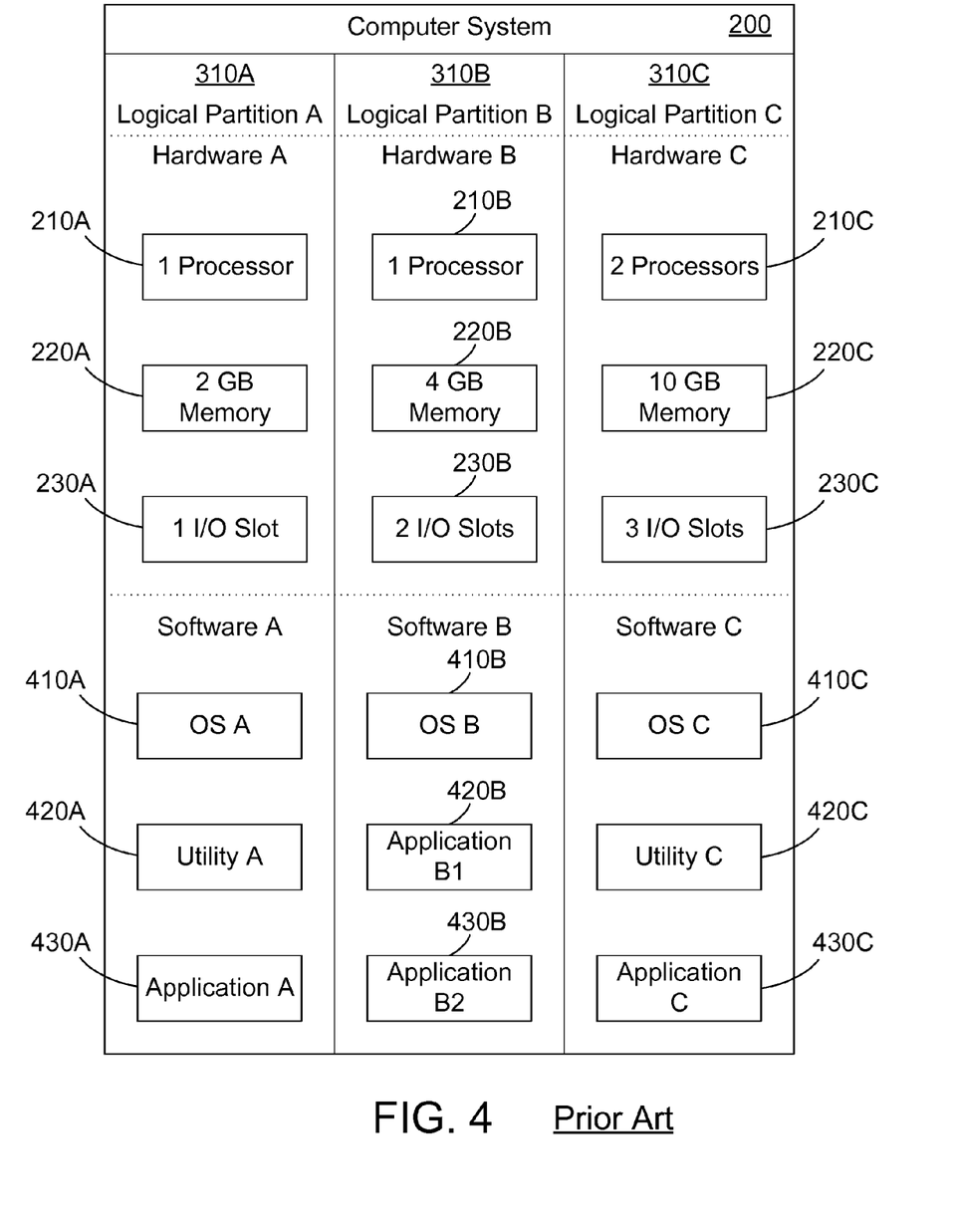
FIG. 4 is a block diagram of the prior art computer system in FIG. 3 after installing an operating system and other software in each logical partition.

Now that hardware resources have been allocated to the logical partitions, software may be installed, as shown in FIG. 4. First, an operating system is typically installed in each partition, followed by utilities or applications as the specific performance needs of each partition require. Thus, for the example in FIG. 4, the first logical partition 310A includes an operating system 410A, a utility 420A, and an application 430A. The second logical partition 310B includes an operating system 410B, and two applications 420B and 430B. The third logical partition 310C includes an operating system 410C, a utility 420C, and an application 430C. Once the software is installed in the logical partitions as shown in FIG. 4, the logically-partitioned computer system is ready for use.

Figure 5:
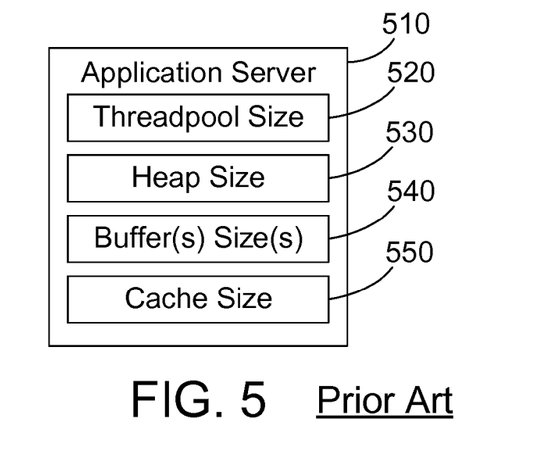
FIG. 5 is a block diagram of a prior art application server with configuration settings that affect performance of the application server.
Figure 6:
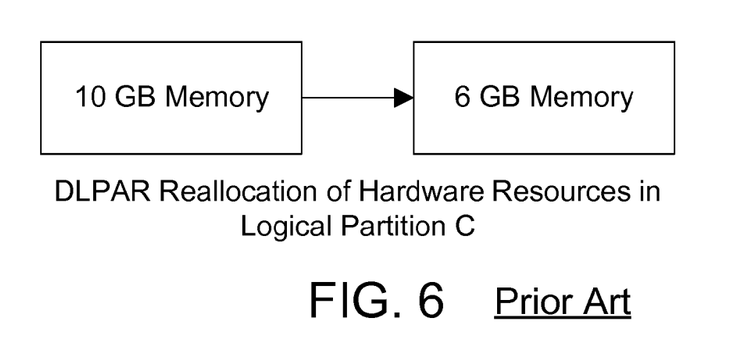
FIG. 6 is a block diagram showing dynamic reallocation of memory in a logical partition as known in the prior art.

Let's now assume computer system 200 in FIG. 4 includes a dynamic partition manager that may dynamically change allocation of resources to or from any of the logical partitions as the logical partitions run. In prior art computer system 200 in FIG. 4, the utilities and applications running within a logical partition do not know they are executing in a logical partition. These utilities and applications may include configuration settings that affect their performance. Note, however, that the values of these configuration settings are typically set according to an assumed allocation of resources. For example, the application server 510 in FIG. 5 could be an example of an application (e.g., 430C in FIG. 4) executing in a logical partition (e.g., logical partition 310C in FIG. 4). As shown in FIG. 5, an application server 510 may have configuration settings that include a threadpool size 520, a heap size 530, sizes of one or more buffers 540, and cache size 550. In the prior art, the configuration settings are set by a system administrator according to available resources. In the prior art computer system in FIG. 4, let's assume the application server 510 is application 430C in logical partition 310C. If a system administrator sets the thread pool size, heap size, buffer sizes, and cache size for the application server according to a present allocation of resources in logical partition 310C as shown in FIG. 4, these values may not be suitable for best performance if the allocation dynamically changes. For example, if the memory allocated to the logical partition 310C is reduced from 10 GB to 6 GB, as shown in FIG. 6, the size of the heap in the application server may cause excessive paging, thereby significantly reducing performance of the application server. Because prior art computer programs are not aware of resource allocation changes in a logical partition, the performance of the computer software cannot be improved with dynamic changes to resources in the logical partition in which the computer program is executed. The preferred embodiments discussed in detail below solve this problem by making a computer program aware of changes to resource allocation in a logical partition, which allows the computer program to autonomically change one or more configuration settings to improve the performance of the computer program in light of the new resource allocation.

2.0 Detailed Description

The preferred embodiments provide a management mechanism within a dynamic partition manager that communicates changes in resource allocation in the logical partition to one or more computer programs running in the logical partition. A computer program includes an agent that communicates with the dynamic partition manager. When the allocation of resources in a logical partition needs to change, or has already been changed, a message is sent to the computer program to notify the computer program of the change in resource allocation in the logical partition. As a result, the computer program may make changes to one or more configuration settings that affect the performance of the computer program. In this way, a computer program may autonomically tune its performance according to changing allocation of resources in the logical partition in which the computer program is run. The computer program may also collect statistics and compare the collected statistics to specified criteria to determine whether an increase in resources in the logical partition should cause the computer program to autonomically adjust its configuration setting(s). In one particular embodiment, the dynamic partition manager notifies the computer program of a change in resource allocation before the change is made, thereby allowing the computer program to change its configuration setting(s) and signal to the dynamic partition manager to proceed with the changes. If the computer program does not respond within a specified time period, the dynamic partition manager makes the change anyway. In this manner, computer programs become aware of changes to the allocation of resources in the logical partition in which they run, and autonomically adjust themselves for optimal performance in an environment where allocation of resources in a logical partition may dynamically change.

Figure 1:
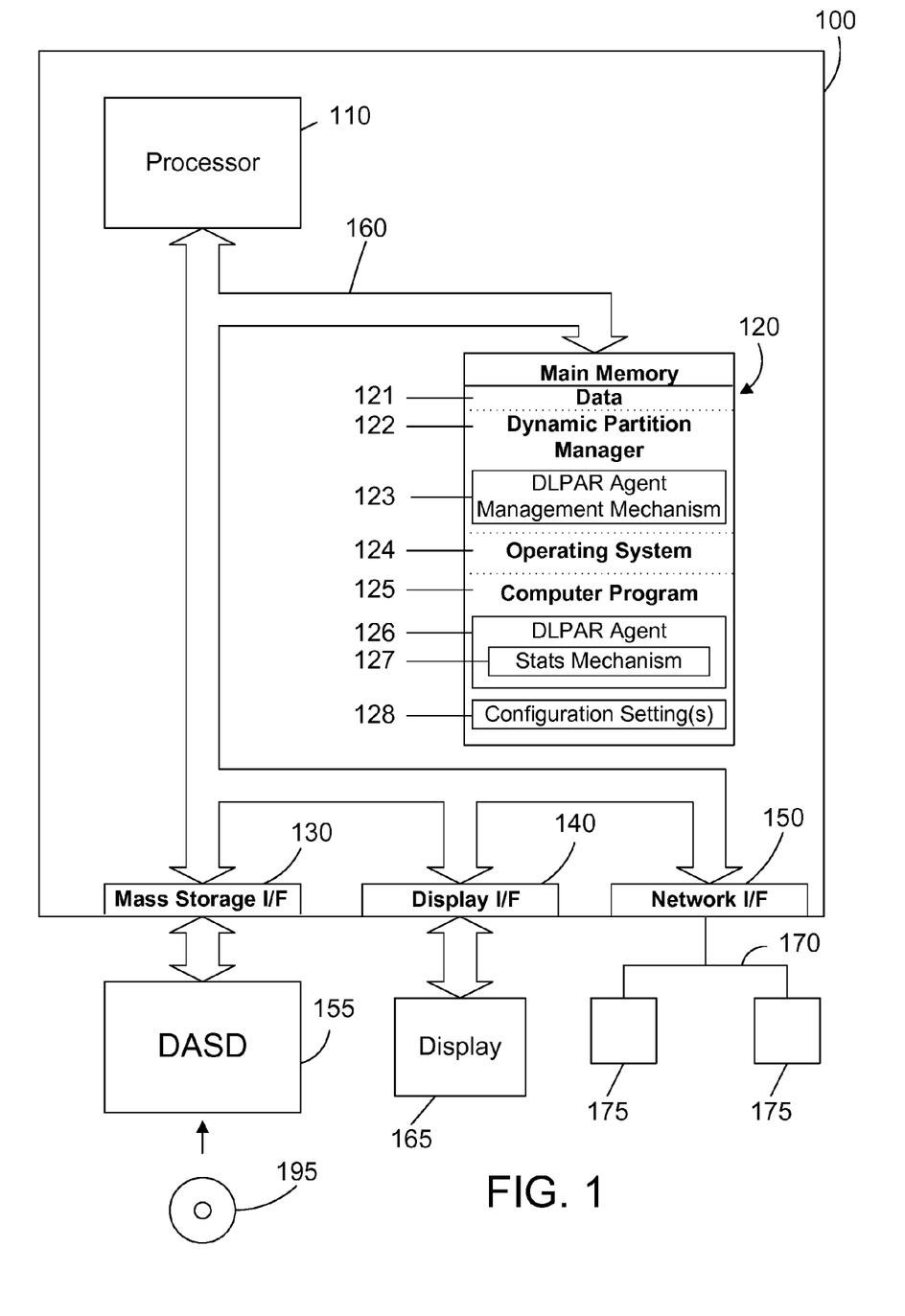
FIG. 1 is a block diagram of a computer apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 in accordance with the preferred embodiments contains data 121, a dynamic partition manager 122, an operating system 124, and a computer program 125. Data 121 represents any data that serves as input to or output from any program in computer system 100. The dynamic partition manager 122 is system software that controls creation and management of multiple logical partitions that are defined on the apparatus 100. The dynamic partition manager 122 also supports dynamic allocation of resources to logical partitions as the logical partitions are running. In addition, the dynamic partition manager 122 includes a DLPAR agent management mechanism 123 that communicates with DLPAR agents in computer programs running it a logical partition. The DLPAR agent management mechanism 123 allows the dynamic partition manager 122 to notify the computer program 125 when a resource allocation change needs to be made or has already been made.

Operating system 124 is a multitasking operating system known in the industry as i5/OS; however, those skilled in the art will appreciate that the spirit and scope of the present invention is not limited to any one operating system. Once the dynamic partition manager 122 defines a logical partition, the operating system 124 and computer program 125 may be installed in the logical partition. The operating system 124 runs under control of the dynamic partition manager 122.

The computer program 125 includes a DLPAR agent 126 that communicates with the DLPAR agent management mechanism 123 in the dynamic partition manager 122. The DLPAR agent 126 includes a statistics mechanism 127 that tracks resource usage in the logical partition in which the computer program 125 runs. This allows the DLPAR agent 126 to intelligently determine whether an increase of resources in the logical partition is likely due to performance limitations in the computer program 125. The DLPAR agent 126 compares collected statistics for the computer program and for its logical partition to specified criteria to determine whether an increase in resources should cause the computer program 125 to autonomically adjust one of more of its configuration settings 128. The term "configuration setting" is used herein in a broad sense to denote any setting or parameter that may be specified by a system administrator or user or that a computer program may specify autonomically at startup that affects performance of the computer program 125. For example, if the computer program 125 were an application server 510 as shown in FIG. 5, the configuration settings could include threadpool size 520, heap size 530, the size of one or more buffers 540, and cache size 550.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, dynamic partition manager 122, operating system 124, and computer program 125 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up dynamic partition manager 122. Dynamic partition manager 122 is a sophisticated program that manages the resources of computer system 100 among different logical partitions. Some of these resources are processor 110, main memory 120, mass storage interface 130, display interface 140, network interface 150, and system bus 160. Once a logical partition is defined using the dynamic partition manager 122, the operating system 124 may be installed and run within the logical partition.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD-RW (e.g., 195 of FIG. 1), and transmission type media such as digital and analog communications links. Note that the preferred signal bearing media is tangible.

Figure 7:
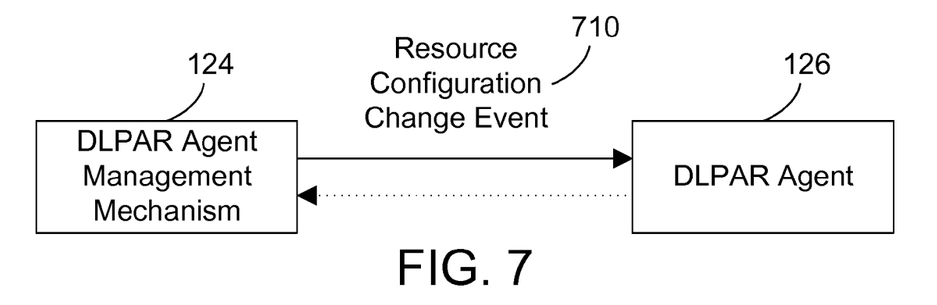
FIG. 7 is a block diagram showing how the DLPAR agent management mechanism notifies a computer program of a resource configuration change event in accordance with the preferred embodiments.

Referring to FIG. 7, the preferred embodiments make a computer program aware of changes in resource allocation in a logical partition by providing a DLPAR agent management mechanism 124 in a dynamic partition manager that communicates a resource configuration change event 710 to a DLPAR agent 126 in a computer program. Note that DLPAR agent 126 may optionally communicate with the DLPAR agent management mechanism 124 as well, as shown by the dotted line in FIG. 7. Because the DLPAR agent management mechanism 124 now informs the DLPAR agent 126 in a computer program when a resource allocation changes in the logical partition where the DLPAR agent 126 is running, the computer program that includes the DLPAR agent 126 can now take action to autonomically adjust one or more of its configuration settings to improve performance in light of the changed resource allocation.

Figure 8:
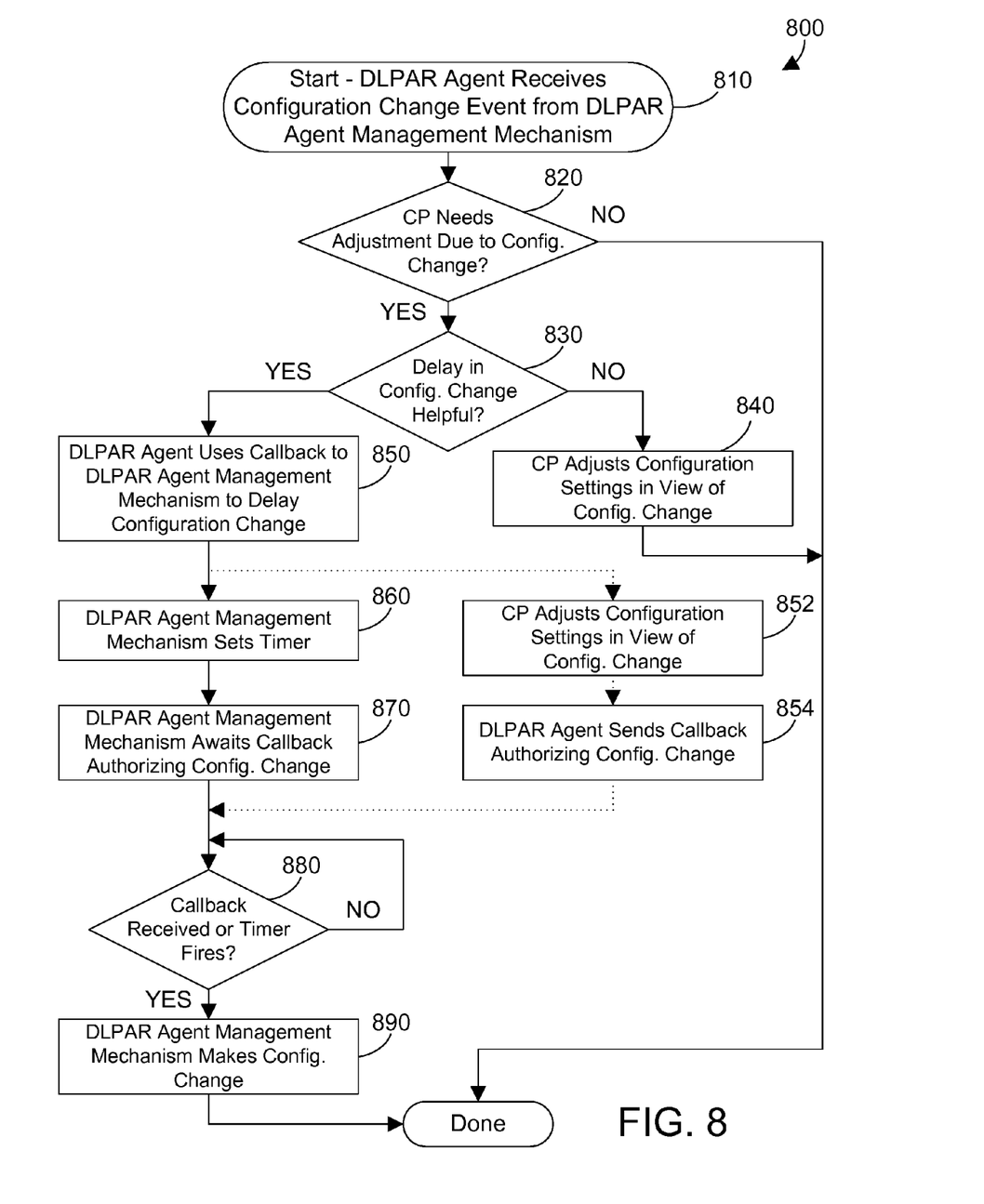
FIG. 8 is a flow diagram of a method in accordance with the preferred embodiments.

Referring to FIG. 8, a method 800 in accordance with the preferred embodiments begins when the DLPAR agent receives a resource configuration change event from the DLPAR agent management mechanism in the dynamic partition manager (step 810). For convenience in the figures and in the discussion below, the term "resource configuration change event" in FIG. 7 has been shortened in FIG. 8 to "configuration change event", and the term "config. change" in FIG. 8 corresponds to the changes communicated in the configuration change event.

Once the DLPAR agent receives the configuration change event, the DLPAR agent determines whether its computer program needs adjustment due to the configuration change (step 820). If not (step 820=NO), method 800 is done. If so (step 820=YES), method 800 determines whether a delay in the configuration change would be helpful (step 830). A delay in the configuration change might be helpful, for example, in the case of decreasing resources to allow the computer program to adjust to the decreased resources before the resources are actually decreased. This prevents poor performance of the computer program that might result from adjusting one or more configuration settings after resources have already been decreased. If a delay in the configuration change is not helpful (step 830), the computer program adjusts one or more configuration settings in view of the impending configuration change communicated in the configuration change event (step 840), and method 800 is done.

If a delay in the configuration change would be helpful (step 830=YES), the DLPAR agent uses a callback to the DLPAR agent management mechanism to delay the configuration change (step 850). The callback essentially asks the dynamic partition manager to delay the change. In response, the DLPAR agent management mechanism sets a timer (step 860), then awaits a callback from the DLPAR agent in the computer program authorizing the configuration change (step 870). In the meantime, the computer program adjusts one or more of its configuration settings in view of the impending configuration change (step 852). Once the adjustment is made, the DLPAR agent in the computer program sends a callback to the DLPAR agent management mechanism authorizing the configuration change to proceed (step 854). Note that steps 852 and 854 are shown with dotted lines to indicate that these steps are being performed by the computer program in parallel to the DLPAR agent management mechanism in the dynamic partition manager performing steps 860 and 870.

Step 880 waits until either the callback message is received authorizing the change to proceed, or the timer fires (step 880=YES). Once either the callback message is received or the timer fires, the DLPAR agent management mechanism makes the configuration change (step 890). The timer allows the change to proceed even if the computer program does not respond to assure the computer program cannot veto a change that the dynamic partition manager needs to perform.

Figure 9:
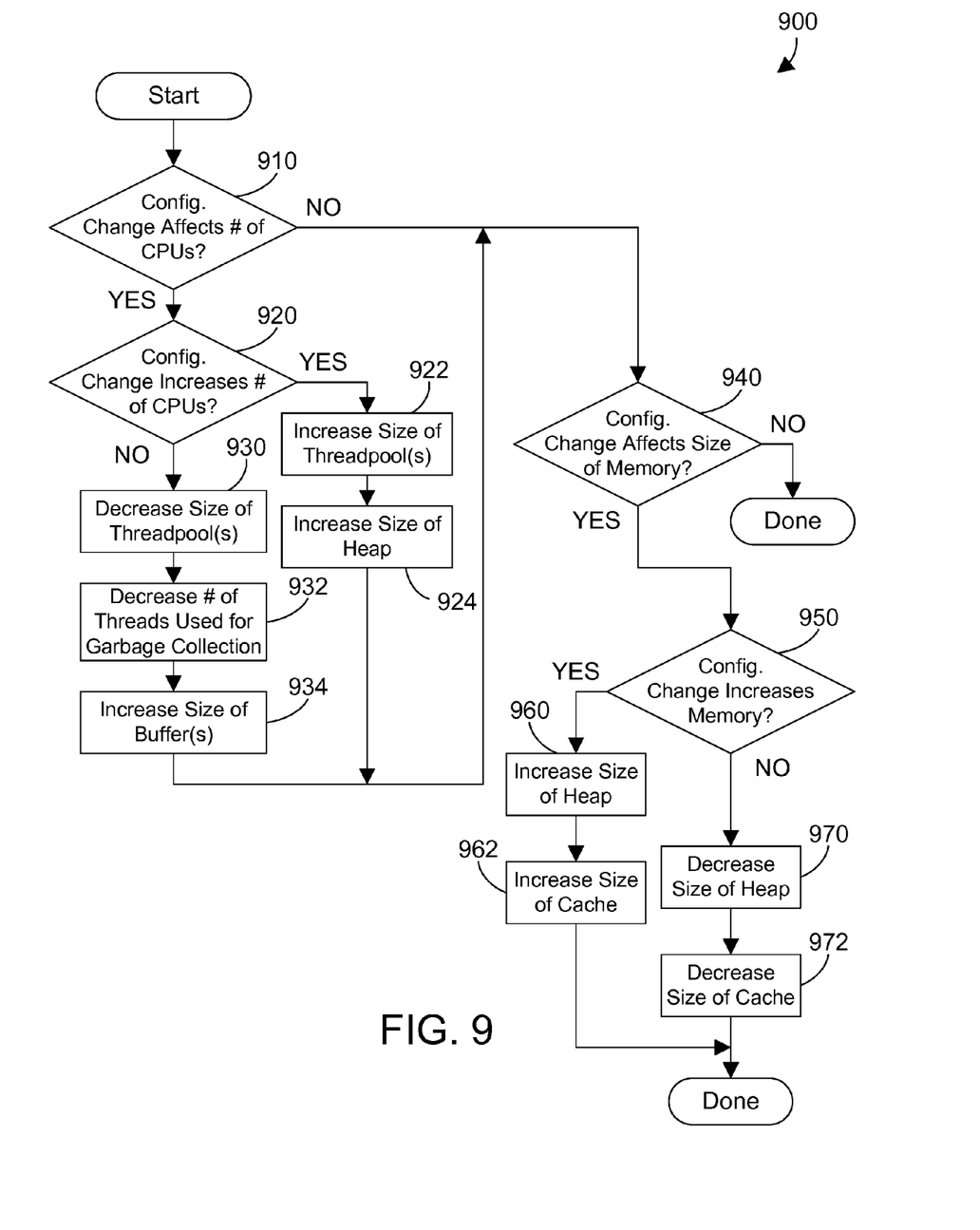
FIG. 9 is a flow diagram of a method in accordance with the preferred embodiments for a computer program to autonomically change one or more configuration settings as a result of a configuration change in the logical partition in which the computer program is run.

A specific example is now presented to illustrate the concepts of the preferred embodiments. We assume the computer program 125 in FIG. 1 is similar to the application server 510 in FIG. 5, which includes a threadpool size 520, a heap size 530, size of one or more buffers 540, and cache size 550. Each of 520, 530, 540 and 550 are configuration settings that affect the performance of the application server 510. Note that an application server of the preferred embodiments not only includes the configuration settings 128 shown in FIG. 5 as 520, 530, 540 and 550, but also includes the DLPAR agent 126 in FIG. 1. Referring to FIG. 9, a method 900 includes steps performed by an application server in accordance with the preferred embodiments to autonomically change one or more of its configuration settings in response to a configuration change event received from the dynamic partition manager. First, method 900 determines whether the configuration change affects the number of CPUs in the logical partition in which the application server is running (step 910). If so (step 910=YES), method 900 determines whether the number of CPUs increases or decreases (step 920). If the number of CPUs increases (step 920=YES), the threadpool size is increased (step 922) and the heap size is increased (step 924). If the number of CPUs decreases (step 920=NO), the threadpool size is decreased (step 930), number of threads used for garbage collection are decreased (step 932), and the size of one or more buffers is increased (step 934) to provide more buffer space in light of reduced CPU capacity.

After making appropriate changes to one or more configuration settings that result from a change in the number of CPUs, or if the configuration change does not affect the number of CPUs (step 910=NO), method 900 determines whether the configuration change affects the size of memory (step 940). If not (step 940=NO), method 900 is done. If the configuration change affects the size of memory allocated to the logical partition in which the application server is running (step 940=YES), method 900 then determines whether the configuration change increases or decreases the memory (step 950). If the configuration change increases the memory (step 950=YES), the heap size is increased (step 960) and the cache size is increased (step 962). If the configuration change decreases the memory (step 950=NO), the heap size is decreased (step 970) and the cache size is decreased (step 972). This simple example illustrated by method 900 in FIG. 9 shows how a computer program may autonomically adjust one or more configuration settings that affect its performance when the computer program receives notification from the dynamic partition manager of a change in resources in the logical partition in which the computer program is running.

Method 900 in FIG. 9 assumes an application server that only cares about changes to the number of processors or memory. However, the preferred embodiments expressly extend to any suitable change of resources in a logical partition. The resource configuration change event 710 in FIG. 7 preferably specifies the configuration change in the logical partition, and the DLPAR agent 126 may then determine whether it cares about the configuration change. If not, it does nothing. If so, the DLPAR agent 126 causes the computer program to autonomically change one or more of its configuration settings to tune the performance of the computer program according to the changed configuration of the logical partition in which the computer program is running. A more sophisticated variation would allow each DLPAR agent 126 to register with the DLPAR agent management mechanism 124 for the changes in which the computer program is interested. When a configuration change is needed, the DLPAR agent management mechanism 124 would then signal only those DLPAR agents that registered to receive notification of this specific type of configuration change.

Note that methods 800 and 900 in FIGS. 8 and 9, respectively, assume that any added resource is added for the benefit of a single computer program. In reality, a logical partition may be executing many different computer programs. If each computer program were to assume an addition of resources were for its own benefit and autonomically change one or more configuration settings to use the additional resources, multiple computer programs could now have configuration settings that are not optimized for the shared environment. To avoid this situation, the preferred embodiments have optional features that allow a computer program to collect performance statistics and decide based on the collected statistics and based on specified criteria whether or not to autonomically adjust one or more of its configuration settings. Method 1000 in FIG. 10 starts by collecting performance statistics for the logical partition that is running the computer program (and hence, the DLPAR agent) (step 1010). The statistics are preferably collected by the statistics mechanism 127 in the DLPAR agent 126 shown in FIG. 1. If a configuration change does not add resources (step 1020=NO), method 1000 is done. If a configuration change adds resources (step 1020=YES), the computer program determines from the performance statistics whether to adjust one or more configuration settings due to the added resources (step 1030). If no adjustment is needed (step 1040=NO), method 1000 is done. If adjustment is needed (step 1040=YES), one or more configuration settings are autonomically adjusted (step 1050). The autonomic adjustment of resources in step 1050 is preferably similar to the steps shown in method 800 in FIG. 8 and method 900 in FIG. 9 when resources are added.

Figure 10:
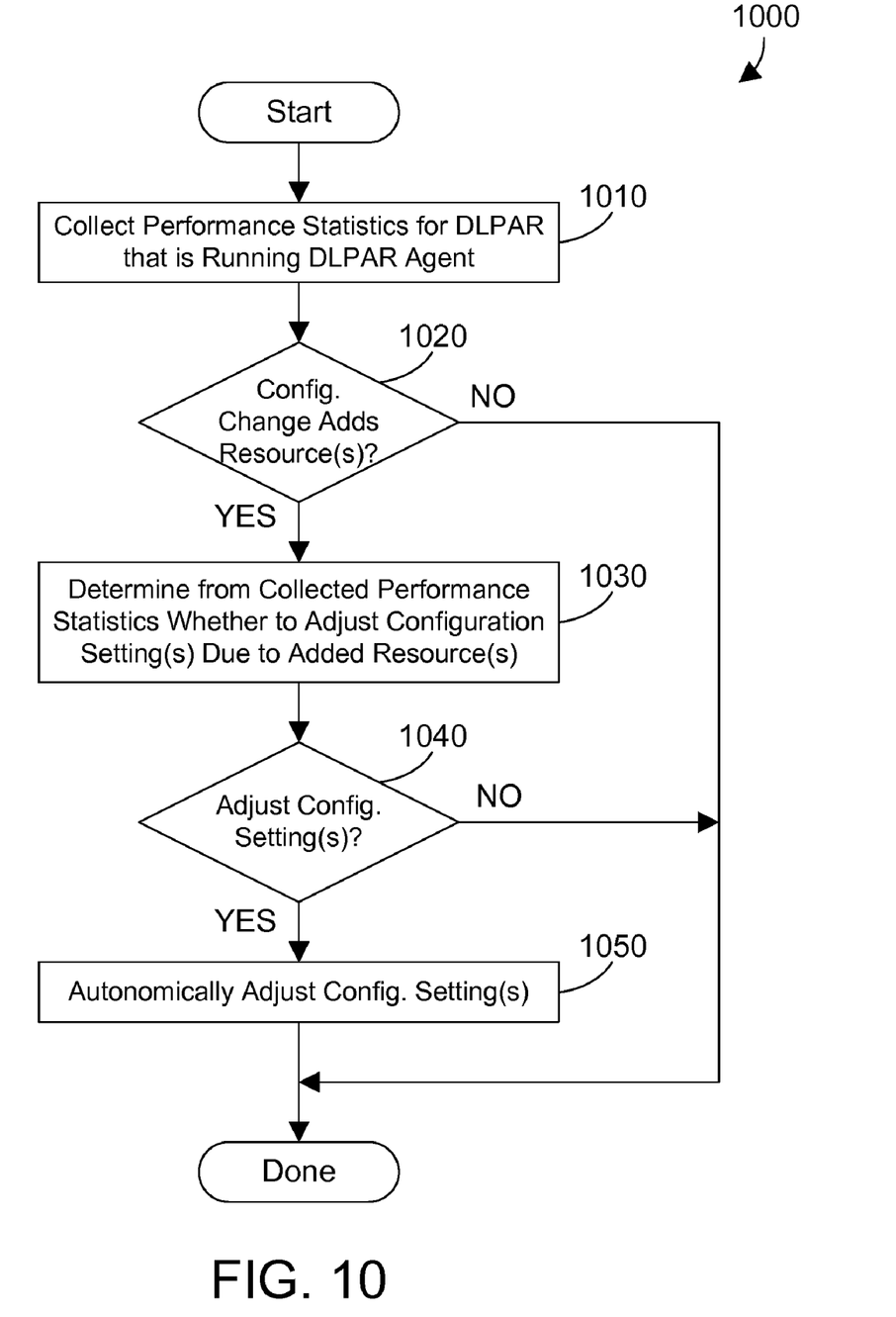
FIG. 10 is a flow diagram of a method in accordance with the preferred embodiments for determining whether a computer program changes its configuration setting(s) when an increase in resources in a logical partition is detected.
Figure 11:
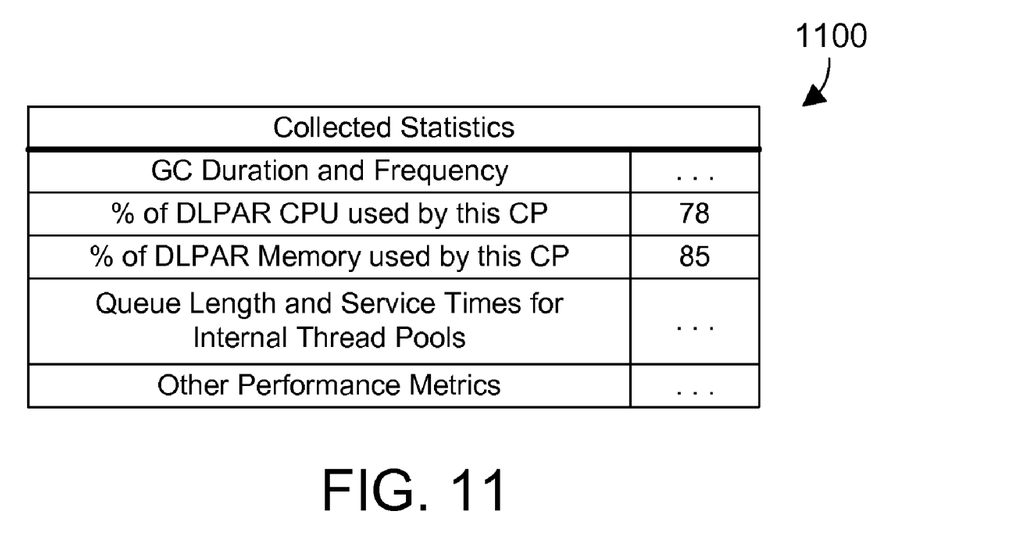
FIG. 11 is a sample table of statistics gathered by the DLPAR agent of a computer program in accordance with the preferred embodiments.

A simple example is now provided to illustrate how method 1000 in FIG. 10 functions. We assume the statistics mechanism 127 in FIG. 1 collects the statistics shown in the table 1100 in FIG. 11. These collected statistics include garbage collection (GC) duration and frequency, the percentage of the CPU power available in the logical partition that is used by this computer program, the percentage of memory available in the logical partition that is used by this computer program, the queue length and service times for internal thread pools, and other performance metrics. We next assume a system administrator has set one or more configuration adjustment criteria as shown in table 1200 in FIG. 12. Note that the system administrator may specify a threshold for each collected statistic. In table 1200, the CPU threshold is set to 75% and the memory threshold is set to 75%. The collected statistics in table 1100 are compared with the thresholds in table 1200 in FIG. 12. Because the percentage of CPU used (78%) is greater than the CPU threshold of 75%, the computer program may assume an added CPU is being added to enhance its performance, and may therefore autonomically adjust one or more of its configuration settings to take advantage of the added CPU capacity. Because the percentage of memory used (85%) is greater than the memory threshold of 75%, the computer program may assume memory is being added to enhance its performance, and may therefore autonomically adjust one or more of its configuration settings to take advantage of the added memory capacity. In similar fashion, if the performance statistics were below the thresholds, the computer program would assume that added resources were not added to improve its performance, and would therefore not make any autonomic adjustments as a result of the addition of new resources in the logical partition that runs the computer program. Note that some of the entries in the tables 1100 and 1200 in FIGS. 11 and 12, respectively, are shown as " . . . " indicating these may contain data that is not needed for the simple example above. By collecting statistics and comparing the collected statistics to a specified configuration adjustment criteria, the preferred embodiments allow a computer program to make a more intelligent decision regarding whether added resources are being added for its benefit or for the benefit of anther program, whether currently running or that will be installed in the future.

Figure 12:
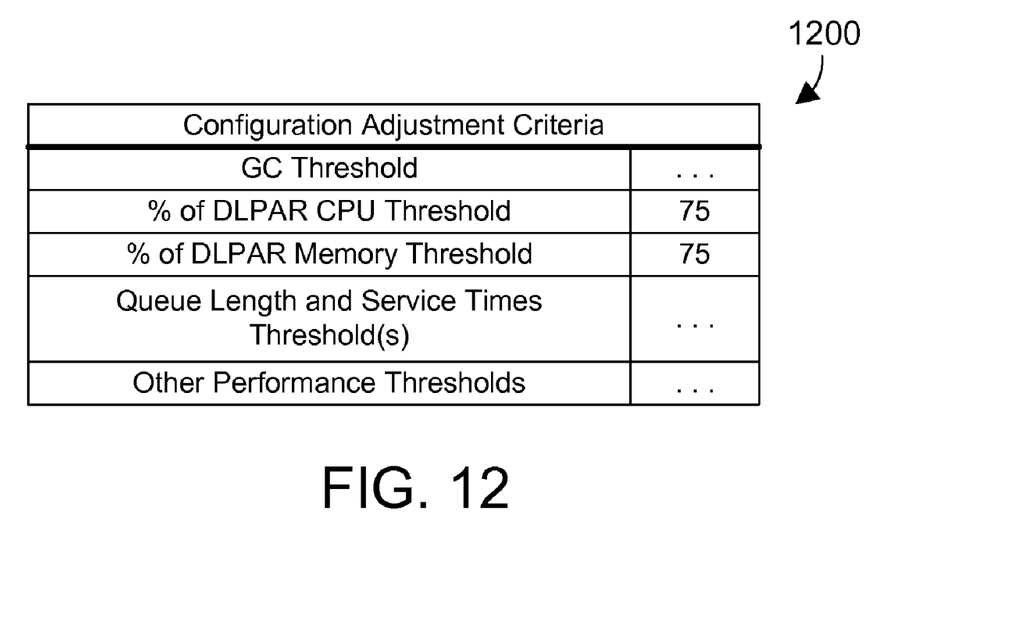
FIG. 12 is a table showing sample configuration adjustment criteria in accordance with the preferred embodiments.

Table 1200 in FIG. 12 shows simple thresholds for the purpose of illustrating the concepts of the preferred embodiments. Note, however, that the preferred embodiments expressly extend to any suitable criteria for determining whether a computer program should make autonomic adjustments to one or more of its configuration settings as a result of the computer program receiving a message indicating a dynamic change in resource allocation in the logical partition that runs the computer program. Suitable criteria include, without limitation, any suitable threshold, formula, or heuristic.

The preferred embodiments enhance the performance of a computer program in a dynamic logical partition by determining when a partition manager needs to change allocation of resources to the logical partition and informing the computer program of the change, thereby allowing the computer program to autonomically adjust one or more of its configuration settings to optimize performance of the computer program in the changed environment. The preferred embodiments thus make computer programs aware of changes in a dynamic logical partition and provide the intelligence to make autonomic adjustments in the computer program to optimize performance of the computer program.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor;
   a plurality of logical partitions defined on the apparatus;
   a dynamic partition manager residing in the memory and executed by the at least one processor, the dynamic partition manager determining an allocation of hardware resources among the plurality of logical partitions and having an ability to dynamically change the allocation of hardware resources while the logical partitions are running; and
   a computer program executing in one of the plurality of logical partitions, the computer program receiving a message from the dynamic partition manager in response to the dynamic partition manager determining that a dynamic change to the allocation of hardware resources is needed in the one logical partition, wherein the computer program is an application server that includes a configuration setting for threadpool size, a configuration setting for heap size, a configuration setting for size of at least one buffer, and a configuration setting for cache size, wherein the application server increases threadpool size and increases heap size when the dynamic change to the allocation of hardware resources increases a number of processors in the one logical partition and increases heap size and increases cache size when the dynamic change to the allocation of hardware resources increases memory size in the one logical partition.

2. The apparatus of claim 1 wherein the computer program, in response to receiving the message from the dynamic partition manager, autonomically changes at least one configuration setting in the computer program that potentially affects performance of the computer program.

3. The apparatus of claim 2 wherein the computer program receives the message from the dynamic partition manager before the dynamic partition manager makes the dynamic change to the allocation of hardware resources in the one logical partition, and responds with a message to the dynamic partition manager after the computer program autonomically changes the at least one configuration setting in the computer program.

4. The apparatus of claim 2 wherein the computer program collects performance statistics for the one logical partition and compares the performance statistics to at least one specified criterion to determine whether or not to autonomically change the at least one configuration setting.

5. An apparatus comprising:
   at least one processor;
   a memory coupled to the at least one processor;
   a plurality of logical partitions defined on the apparatus;
   a dynamic partition manager residing in the memory and executed by the at least one processor, the dynamic partition manager determining an allocation of hardware resources among the plurality of logical partitions and having an ability to dynamically change the allocation of hardware resources while the logical partitions are running; and a computer program executing in one of the plurality of logical partitions, the computer program receiving a message from the dynamic partition manager in response to the dynamic partition manager determining that a dynamic change to the allocation of hardware resources is needed in the one logical partition, wherein the computer program is an application server that includes a configuration setting for threadpool size, a configuration setting for heap size, a configuration setting for size of at least one buffer, and a configuration setting for cache size, wherein the application server decreases threadpool size and increases size of the at least one buffer when the dynamic change to the allocation of hardware resources decreases a number of processors in the one logical partition and decreases heap size and decreases cache size when the dynamic change to the allocation of hardware resources decreases memory size in the one logical partition.

6. The apparatus of claim 5 wherein the computer program, in response to receiving the message from the dynamic partition manager, autonomically changes at least one configuration setting in the computer program that potentially affects performance of the computer program.

7. The apparatus of claim 6 wherein the computer program receives the message from the dynamic partition manager before the dynamic partition manager makes the dynamic change to the allocation of hardware resources in the one logical partition, and responds with a message to the dynamic partition manager after the computer program autonomically changes the at least one configuration setting in the computer program.

8. The apparatus of claim 6 wherein the computer program collects performance statistics for the one logical partition and compares the performance statistics to at least one specified criterion to determine whether or not to autonomically change the at least one configuration setting.

9. A program product comprising:
   (A) a computer program that executes in one of a plurality of logical partitions, the computer program receiving a message from a dynamic partition manager in response to the dynamic partition manager determining that a dynamic change to an allocation of hardware resources is needed in the one logical partition while the one logical partition is running, wherein the computer program is an application server that includes a configuration setting for threadpool size, a configuration setting for heap size, a configuration setting for size of at least one buffer, and a configuration setting for cache size, wherein the application server increases threadpool size and increases heap size when the dynamic change to the allocation of hardware resources increases a number of processors in the one logical partition and increases heap size and increases cache size when the dynamic change to the allocation of hardware resources increases memory size in the one logical partition; and
   (B) recordable media bearing the computer program.

10. The program product of claim 9 wherein the computer program, in response to receiving the message from the dynamic partition manager, autonomically changes at least one configuration setting in the computer program that potentially affects performance of the computer program.

11. The program product of claim 10 wherein the computer program receives the message from the dynamic partition manager before the dynamic partition manager makes the dynamic change to the allocation of hardware resources in the one logical partition, and responds with a message to the dynamic partition manager after the computer program autonomically changes the at least one configuration setting in the computer program.

12. The program product of claim 10 wherein the computer program collects performance statistics for the one logical partition and compares the performance statistics to at least one specified criterion to determine whether or not to autonomically change the at least one configuration setting.

13. A program product comprising:
   (A) a computer program that executes in one of a plurality of logical partitions, the computer program receiving a message from a dynamic partition manager in response to the dynamic partition manager determining that a dynamic change to an allocation of hardware resources is needed in the one logical partition while the one logical partition is running, wherein the computer program is an application server that includes a configuration setting for threadpool size, a configuration setting for heap size, a configuration setting for size of at least one buffer, and a configuration setting for cache size, wherein the application server decreases threadpool size and increases size of the at least one buffer when the dynamic change to the allocation of hardware resources decreases a number of processors in the one logical partition and decreases heap size and decreases cache size when the dynamic change to the allocation of hardware resources decreases memory size in the one logical partition; and
   (B) recordable media bearing the computer program.

14. The program product of claim 13 wherein the computer program, in response to receiving the message from the dynamic partition manager, autonomically changes at least one configuration setting in the computer program that potentially affects performance of the computer program.

15. The program product of claim 14 wherein the computer program receives the message from the dynamic partition manager before the dynamic partition manager makes the dynamic change to the allocation of hardware resources in the one logical partition, and responds with a message to the dynamic partition manager after the computer program autonomically changes the at least one configuration setting in the computer program.

16. The program product of claim 14 wherein the computer program collects performance statistics for the one logical partition and compares the performance statistics to at least one specified criterion to determine whether or not to autonomically change the at least one configuration setting.

17. A method for dynamically changing performance of a computer program running in one logical partition in a computer system that includes a plurality of logical partitions, the method comprising the steps of:
  a dynamic partition manager determining that a dynamic reallocation of hardware resources in the one logical partition is needed while the one logical partition is running;
  the dynamic partition manager sending a message to the computer program regarding the dynamic reallocation of hardware resources in the one logical partition; and
  in response to receiving the message from the dynamic partition manager, the computer program autonomically changing at least one configuration setting in the computer program that potentially affects performance of the computer program, wherein the computer program is an application server that includes a configuration setting for threadpool size, a configuration setting for heap size, a configuration setting for size of at least one buffer, and a configuration setting for cache size, wherein the application server increases threadpool size and increases heap size when the dynamic change to the allocation of hardware resources increases a number of processors in the one logical partition and increases heap size and increases cache size when the dynamic change to the allocation of hardware resources increases memory size in the one logical partition.

18. The method of claim 17 wherein the computer program receives the message from the dynamic partition manager before the dynamic partition manager makes the dynamic change to the allocation of hardware resources in the one logical partition, and responds with a message to the dynamic partition manager after the computer program autonomically changes the at least one configuration setting in the computer program.

19. The method of claim 17 further comprising the steps of:
  the computer program collecting performance statistics for the one logical partition; and
  comparing the performance statistics to at least one specified criterion to determine whether or not the computer program will autonomically change the at least one configuration setting.

20. A method for dynamically changing performance of a computer program running in one logical partition in a computer system that includes a plurality of logical partitions, the method comprising the steps of:
  a dynamic partition manager determining that a dynamic reallocation of hardware resources in the one logical partition is needed while the one logical partition is running;
  the dynamic partition manager sending a message to the computer program regarding the dynamic reallocation of hardware resources in the one logical partition; and
  in response to receiving the message from the dynamic partition manager, the computer program autonomically changing at least one configuration setting in the computer program that potentially affects performance of the computer program, wherein the computer program is an application server that includes a configuration setting for threadpool size, a configuration setting for heap size, a configuration setting for size of at least one buffer, and a configuration setting for cache size, wherein the application server decreases threadpool size and increases size of the at least one buffer when the dynamic change to the allocation of hardware resources decreases a number of processors in the one logical partition and decreases heap size and decreases cache size when the dynamic change to the allocation of hardware resources decreases memory size in the one logical partition.

21. The method of claim 20 wherein the computer program receives the message from the dynamic partition manager before the dynamic partition manager makes the dynamic change to the allocation of hardware resources in the one logical partition, and responds with a message to the dynamic partition manager after the computer program autonomically changes the at least one configuration setting in the computer program.

22. The method of claim 21 further comprising the steps of:
  the computer program collecting performance statistics for the one logical partition; and
  comparing the performance statistics to at least one specified criterion to determine whether or not the computer program will autonomically change the at least one configuration setting.

* * * * *